United States Patent
Lee et al.

(10) Patent No.: US 10,752,413 B2
(45) Date of Patent: Aug. 25, 2020

(54) CONTAINER FOR KEEPING FERMENTED FOOD

(71) Applicant: CJ Cheiljedang Corporation, Seoul (KR)

(72) Inventors: Byung Kook Lee, Seoul (KR); Yoon Seung Nam, Seoul (KR); Kwang Soo Park, Gyeonggi-do (KR); Hae Sun Lee, Seoul (KR); Gyu Hwan Cha, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 19 days.

(21) Appl. No.: 15/764,790

(22) PCT Filed: Sep. 30, 2016

(86) PCT No.: PCT/KR2016/011008
§ 371 (c)(1),
(2) Date: Mar. 29, 2018

(87) PCT Pub. No.: WO2017/057969
PCT Pub. Date: Apr. 6, 2017

(65) Prior Publication Data
US 2018/0290797 A1 Oct. 11, 2018

(30) Foreign Application Priority Data

Oct. 2, 2015 (KR) .................. 10-2015-0138951

(51) Int. Cl.
*B65D 51/16* (2006.01)
*B65D 43/02* (2006.01)
*B01D 46/10* (2006.01)

(52) U.S. Cl.
CPC ..... *B65D 51/1644* (2013.01); *B65D 43/0225* (2013.01); *B65D 51/1616* (2013.01);
(Continued)

(58) Field of Classification Search
CPC ............ B65D 51/1644; B65D 51/1661; B65D 51/1633; B65D 43/0225; B65D 51/1622;
(Continued)

(56) References Cited

U.S. PATENT DOCUMENTS 2,514,124 A * 7/1950 Eisen .................. B65D 41/045
215/260
4,463,880 A * 8/1984 Kramer ................ B65D 47/42
222/189.08
(Continued)

FOREIGN PATENT DOCUMENTS

JP 3043982 U 9/1997
JP H11-314679 A 11/1999
(Continued)

OTHER PUBLICATIONS

Japanese Office Action, JP2018-516530, dated Oct. 5, 2018, 2 pages.
(Continued)

*Primary Examiner* — Ernesto A Grano
(74) *Attorney, Agent, or Firm* — Adsero IP

(57) ABSTRACT

Disclosed is a container for keeping fermented food, including a body configured to contain the fermented food therein, a cover configured to close the body, and a sealing sheet configured to maintain airtightness between the body and the cover. The cover includes a plurality of gas flow channels which extend from a center of a bottom surface to an inner peripheral surface, and a plurality of gas discharge channels which extend from an upper end of the inner peripheral surface to a lower end. In addition, the sealing sheet has a through-hole to allow an interior and an exterior of the body to communicate with each other.

6 Claims, 4 Drawing Sheets

(52) U.S. Cl.
CPC ..... *B65D 51/1622* (2013.01); *B65D 51/1633* (2013.01); *B65D 51/1661* (2013.01); *B01D 46/10* (2013.01); *B01D 2279/35* (2013.01); *B65D 2543/00092* (2013.01); *B65D 2543/00527* (2013.01); *B65D 2543/00537* (2013.01)

(58) Field of Classification Search
CPC ............... B65D 51/1616; B65D 46/10; B65D 2543/00527; B65D 2543/00092; B65D 2543/00537
USPC .................................................. 220/203.29
See application file for complete search history.

(56) References Cited

U.S. PATENT DOCUMENTS

| | | | | |
|---|---|---|---|---|
| 5,507,942 | A * | 4/1996 | Davis | B01D 17/10 123/1 A |
| 5,782,383 | A * | 7/1998 | Robinson | A61J 1/1406 215/250 |
| 7,074,443 | B2 * | 7/2006 | Thomas | B65D 51/1644 220/203.01 |
| 7,909,192 | B2 * | 3/2011 | Dempsey | B65D 51/1644 220/203.03 |
| 8,758,488 | B1 * | 6/2014 | Wickland | B32B 5/30 55/385.4 |
| 8,783,292 | B2 * | 7/2014 | Hoffman | B65D 77/225 137/550 |
| 2002/0054938 | A1 * | 5/2002 | Hiyoshi | B65D 77/225 426/112 |
| 2005/0150890 | A1 * | 7/2005 | Wang | B65D 43/0212 220/256.1 |
| 2007/0292055 | A1 * | 12/2007 | Reuhs | B65D 81/2023 383/103 |
| 2009/0232947 | A1 * | 9/2009 | Buisson | B65D 51/1644 426/118 |
| 2010/0084396 | A1 * | 4/2010 | Wu | B65D 45/20 220/203.29 |
| 2011/0186536 | A1 * | 8/2011 | Wurster | B65D 51/1616 215/307 |
| 2013/0064481 | A1 * | 3/2013 | Yamamoto | B32B 3/266 383/200 |
| 2016/0083155 | A1 * | 3/2016 | Anderson | B65D 1/10 426/7 |

FOREIGN PATENT DOCUMENTS

| | | |
|---|---|---|
| JP | 2000-302156 A | 10/2000 |
| JP | 2001-080679 A | 3/2001 |
| JP | 2003-024234 A | 1/2003 |
| JP | 2004-189264 A | 7/2004 |
| KR | 1999-0008426 | 3/1999 |
| KR | 20-0233048 | 9/2001 |
| KR | 20-0396835 | 9/2005 |
| KR | 10-1414183 | 7/2014 |
| WO | WO 2013-042949 | 3/2013 |

OTHER PUBLICATIONS

International Search & Written Opinion, International Patent Application No. PCT/KR2016/011008, dated Feb. 1, 2017; 10 pages.
International Application Status Report, International Patent Application No. PCT/KR2016/011008, dated Mar. 1, 2017; 2 pages.

* cited by examiner

[Fig. 1]
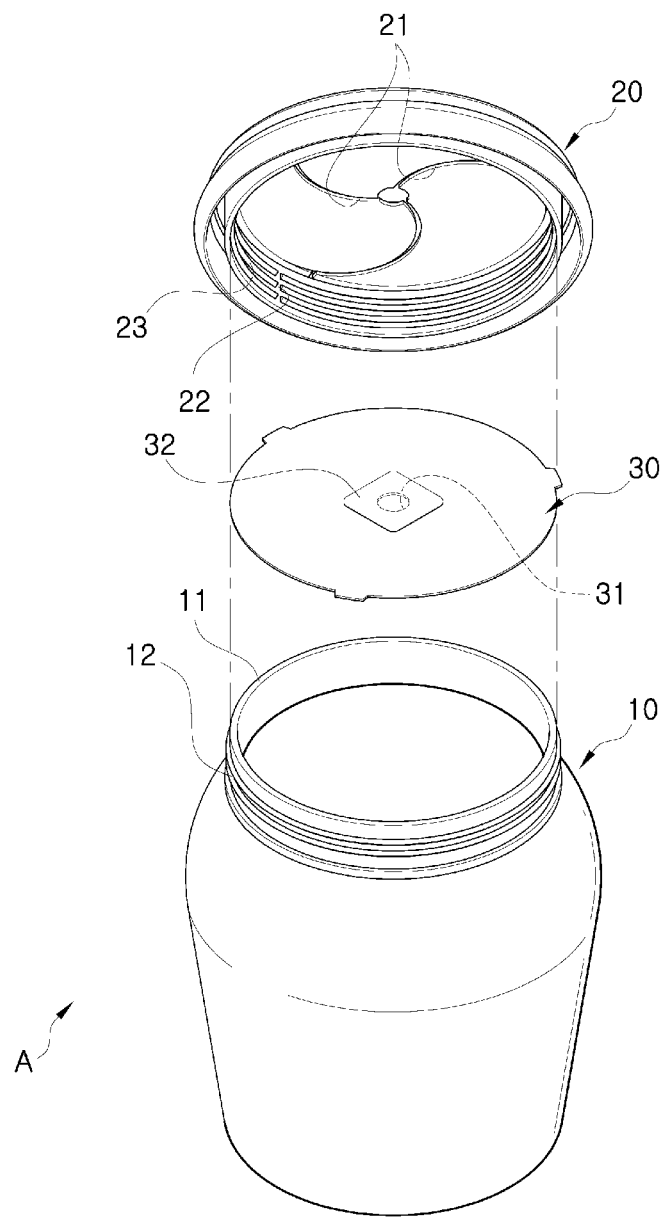

[Fig. 2]
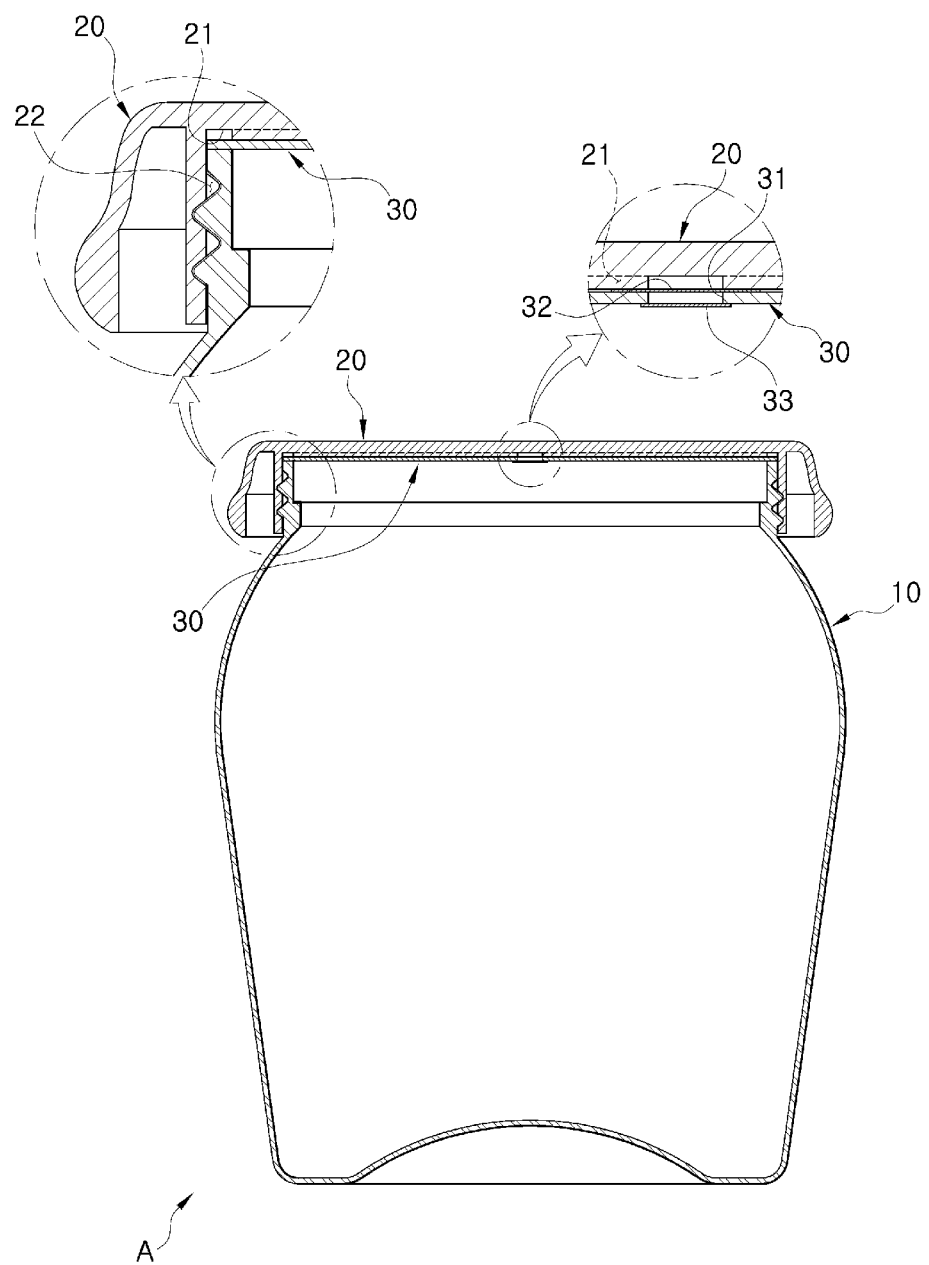

[Fig 3]
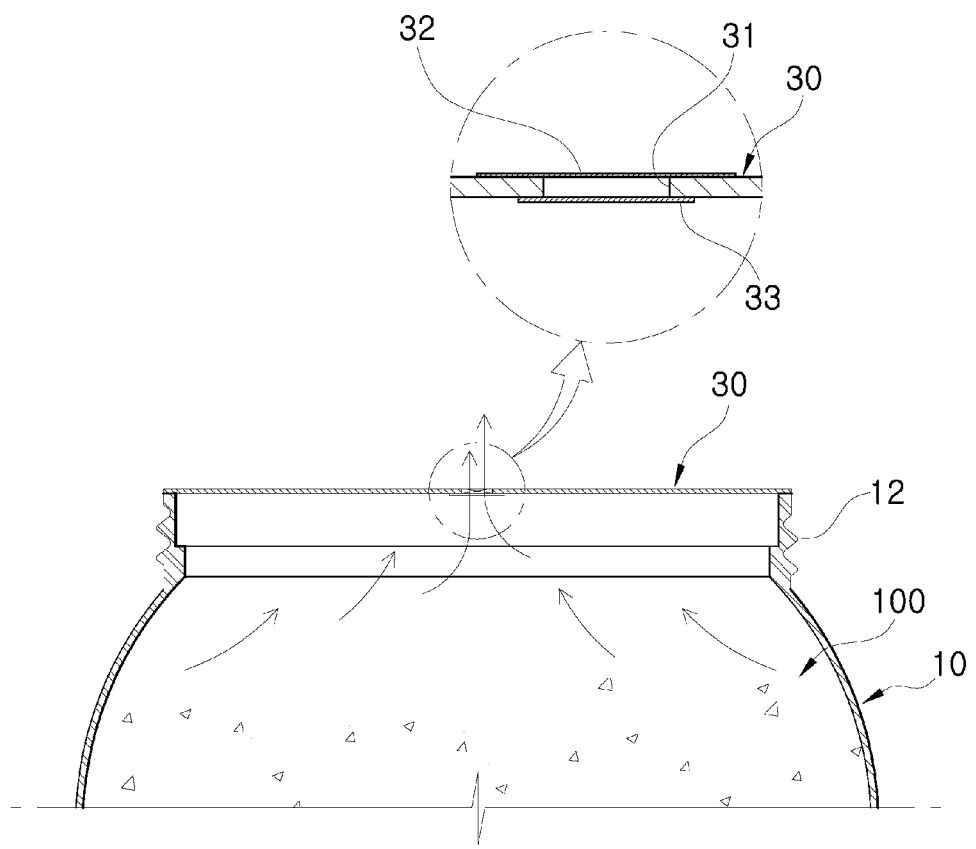

[Fig. 4]
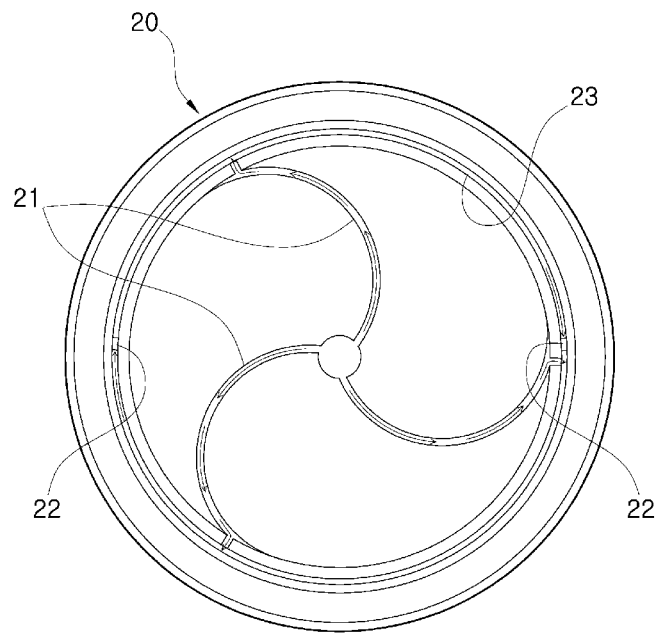
[Fig. 5]
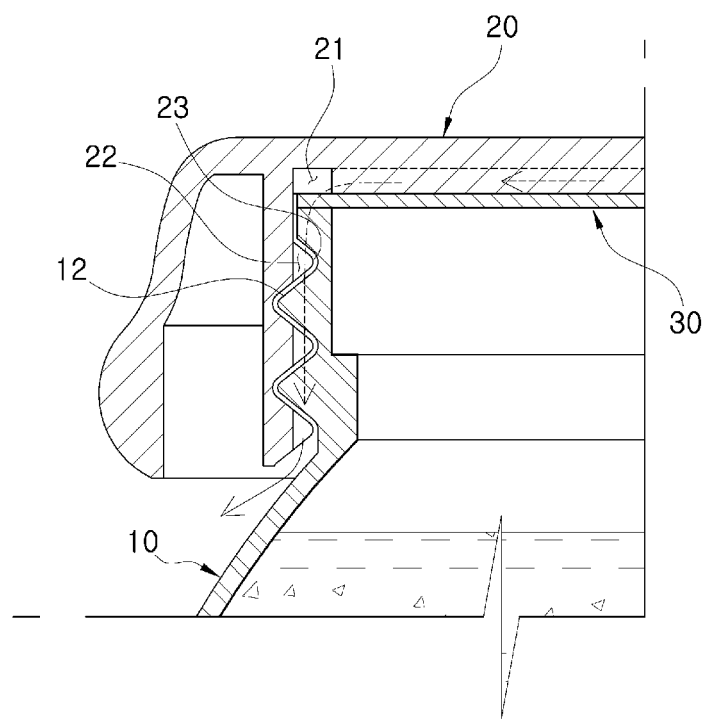

CONTAINER FOR KEEPING FERMENTED FOOD

RELATED APPLICATIONS

This application is a 35 U.S.C. § 371 national phase application of International Application No. PCT/KR2016/011008 (WO 2017-057969 A1), filed on Sep. 30, 2016, entitled "Container for Keeping Fermented Food", which application claims the benefit of Korean Application No. 10-2015-0138951, filed on Oct. 2, 2015, which is incorporated herein by reference in its entirety.

BACKGROUND OF THE INVENTION

Field of the Invention

The present invention relates to a container for keeping fermented food therein, and, more particularly, to a container for keeping fermented food which can allow gas generated in a fermenting process of the fermented food contained in a body to smoothly discharge outwardly from the body, thereby preventing the body from being damaged due to generation of the gas and also the fermented food from leaking from the body.

Background of the Related Art

In a case where food comes into contact with air, the food will be contaminated with alien substances, such as dusts contained in the air, and also be spoiled by deterioration or the like.

Accordingly, food is usually kept by use of a container consisting of a body and a cover at homes, businesses, manufactures, and so forth.

In other words, the food is put in the body, and then the body is closed by the cover to block the food from coming into contact with the air.

Meanwhile, fermented food, such as kimchi or the like, generates gas, i.e., carbon dioxide, in a fermenting process. In a case where the body is filled with fermented food and is closed in an airtight manner by the cover, generation of the gas may cause the body to inflate, so that the body may be cracked or damaged.

In this instance, if the body is incompletely closed by the cover, the gas generated in the fermenting process of the fermented food is leaked between the body and the cover, thereby simply preventing the body from being damaged due to the gas.

In the case where the body is incompletely closed by the cover, however, the fermented food may be leaked from a gap between the body and the cover, thereby leading to a pollution problem. Also, an ambient air, i.e., oxygen, flows into the body through the gap between the body and the cover, so that leaven works in the fermented food or the fermented food spoils.

To solve the above problem, Korean Unexamined Utility Model No. 20-1993-0023746 (published on Dec. 16, 1993) discloses a gas absorbent applied to a fermented food storage for keeping fermented food, for example, kimchi, therein.

If the gas absorbent is applied to the fermented food storage, the gas absorbent absorbs the gas generated in the fermenting process of the fermented food, thereby preventing the body from being damaged due to the gas.

However, since the gas absorber has a limit in absorption of the gas, if the absorbing amount reaches the limit, or the gas absorber drops in the fermented falls in the fermented food, the gas absorber loses the gas absorbing function, which may cause the body to damage due to the gas.

Some containers for keeping fermented foods have been supposed to allow the gas generated in the fermenting process of the fermented food to smoothly discharge outwardly from the body and also block the inflow of the ambient air into the body from the atmosphere. However, such containers cannot obtain satisfactory results so far.

SUMMARY OF THE INVENTION

Therefore, the present invention has been made in view of the above problems, and an object of the present invention is to provide a container for keeping fermented food which can solve a problem of a container of the prior art in that a body is damaged due to gas generated in a fermenting process of the fermented food when the fermented food is kept in the container.

In addition, another object of the present invention is to provide a container for keeping fermented food which can solve other problem of a container of the prior art in that when the fermented food is kept in the container, oxygen flows into a body through a gap between a body and a cover, so that leaven works in the fermented food or the fermented food spoils.

Further another object of the present invention is to provide a container for keeping fermented food which can solve the other problem of a container of the prior art in that when the fermented food is kept in the container, the fermented food is leaked from a gap between a body and a gap, which leads to pollution.

In order to achieve the above objects, there is provided a container for keeping fermented food, including: a body configured to contain the fermented food therein; a cover configured to close the body; and a sealing sheet configured to maintain airtightness between the body and the cover, wherein the cover includes a plurality of gas flow channels which extend from a center of a bottom surface to an inner peripheral surface, and a plurality of gas discharge channels which extend from an upper end of the inner peripheral surface to a lower end, and the sealing sheet has a through-hole to allow an inside and an outside of the body to communicate with each other.

Preferably, the gas flow channels are formed in a curved line, and are arranged in a radial direction.

Preferably, the gas discharge channels are formed to transversely penetrate threads which are formed on the inner peripheral surface.

Preferably, the sealing sheet further has on either surface thereof a filter which is in close contact with the through-hole.

Preferably, the filter is made of hydrophobic material.

Preferably, the through-hole has a valve at an upper or lower inlet thereof, the valve being automatically opened under allowable pressure or more.

Preferably, the allowable pressure is set to a range of 0.3 to 2.0 mbar.

Preferably, the through-hole is formed to have a diameter of 0.2 to 2.0 mm.

Preferably, the sealing sheet is fused to an upper end of the body along an edge thereof by high-frequency fusion.

With the construction of the container for keeping the fermented food according to the present invention, the sealing sheet has the through-hole, and the cover has the gas flow channels and the gas discharge channels. After the gas generated in the fermenting process of the fermented food flows to the cover through the through-hole, the gas flows along the gas flow channels and the gas discharge channels, and then is discharged outwardly from the body, thereby preventing the body from being damaged due to the generation of the gas from the fermented food.

In addition, the sealing sheet further has the filter which is in close contact with the through-hole. Since the filter blocks the liquid of the fermented food from leaking from the body through the through-hole, it is possible to prevent the pollution caused by the leakage of the fermented food.

Furthermore, the through-hole is provided with the valve which is automatically opened under the allowable pressure or more. The valve allows the gas to discharge outwardly from the body through the through-hole, and also blocks the inflow of the ambient air into the body from the atmosphere, thereby preventing leaven from working in the fermented food or the fermented food from spoiling.

BRIEF DESCRIPTION OF THE DRAWINGS

FIG. 1 is an exploded perspective view illustrating the construction of a container for keeping fermented food according to the present invention.

FIG. 2 is a cross-sectional view illustrating the construction of the container for keeping fermented food according to the present invention to show an engaged state thereof.

FIG. 3 is a view illustrating a discharge of a gas away from a through-hole provided in the container for keeping fermented food according to the present invention.

FIG. 4 is a view illustrating a flow of the gas away from gas flow channels provided in the container for keeping fermented food according to the present invention.

FIG. 5 is a view illustrating a discharge of the gas away from gas discharge channels provided in the container for keeping fermented food according to the present invention.

DETAILED DESCRIPTION OF THE PREFERRED EMBODIMENT

The present invention will now be described in detail with reference to the accompanying drawings.

As shown in FIGS. 1 and 2, a container A for keeping fermented food according to the present invention includes a body 10, a cover 20 and a sealing sheet 30.

The body 10 contains a fermented food 100 in an inner space thereof.

The body 10 may be made of polyethylene terephthalate.

In the case the body 10 is made of polyethylene terephthalate, the container does only cause harm to a human body due to features of the material, and also the durability thereof is relatively stable.

In addition, the body 10 may be formed by injection blow.

The injection blow allows the body 10 to be easily produced in mass amounts due to characteristics of the technology.

The body 10 is provided with threads 12 on an outer peripheral surface of a neck 11.

If the body 10 is provided with the threads 12, the body 10 can be engaged to the cover 20 as the threads 12 are threadedly engaged to threads 23 formed on an inner peripheral surface of the cover 20.

The cover 20 closes the interior of the body 10.

The cover 20 is provided with a plurality of gas flow channels 21 and a plurality of gas discharge channels 22.

The gas flow channels 21 extend from a center of a bottom surface of the cover 20 to the inner peripheral surface.

The gas discharge channels 22 extend from an upper end of the inner peripheral surface to a lower end.

Since the cover 20 is provided with the gas flow channels 21 and the gas discharge channels 22, the gas to be discharged from the body 10 through a through-hole 31 formed in the sealing sheet flows along the gas flow channels 21, and then is discharged outwardly through the gas discharge channels 22, as will be described hereinafter.

Preferably, the gas flow channels 21 are formed in a curved line.

If the gas flow channels 21 are formed in the curved line, the gas contained in the body 10 with inner pressure being higher than atmospheric pressure flows along the gas flow channels 21 due to characteristics of the shape, but ambient air lower than the pressure of the gas cannot flow in along the gas flow channels 21, thereby preventing inflow of the ambient air from flowing into the body 10 from the atmosphere.

Preferably, the gas flow channels 21 are arranged in a radial direction.

If the gas flow channels 21 are arranged in the radial direction, the gas to be discharged through the through-hole 31 flows evenly along the respective gas flow channels 21, thereby allowing the gas to smoothly flow through the gas flow channels 21.

Preferably, the gas flow channels 22 are formed to transversely penetrate the threads 23 formed on the inner peripheral surface.

If the gas flow channels 22 penetrate transversely the threads 23, the threads 23 do not interfere in the flow of the gas when the gas flows along the gas discharge grooves 22.

The sealing sheet 30 keeps an airtight state between the body 10 and the cover 20.

The sealing sheet 30 has the through-hole 31 to allow the exterior and the interior of the body 10 to communicate with each other.

Since the sealing sheet 30 has the through-hole 31, the gas produced from the fermented food 100 contained in the body 10 is discharged outwardly from the interior of the body 10 through the through-hole 21.

Preferably, the through-hole 31 has a diameter of 0.2 to 2.0 mm.

If the diameter of the through-hole 31 is less than 0.2 mm, the gas is not smoothly discharged from the through-hole 31. On the other hand, if the diameter of the through-hole 31 is more than 2.0 mm, the gas is excessively discharged from the through-hole 31, so that the gas may be congested in the gas flow channels 21. As a result, the through-hole 31 is formed to have the diameter of 0.2 to 2.0 mm.

Preferably, the through-hole 31 has a valve 32 at an upper or lower inlet of the through-hole, the valve being automatically opened under allowable pressure or more.

If the through-hole 31 has the valve 32, when the gas pressure is raised in the body 10, the valve 32 is automatically opened so that the gas is discharged outwardly from the body 10 through the through-hole 31.

Preferably, the allowable pressure of the valve 32 is set to a range of 0.3 to 2.0 mbar.

If the allowable pressure is less than 0.3 mbar, the valve 32 is always opened, and thus the ambient air can flow into the body 10 through the through-hole 31. On the other hand, if the allowable pressure is more than 2.0 mbar, the gas pressure is highly raised in the body 10, thereby causing the sealing sheet 30 to be damaged, such as inflation. As a result, the allowable pressure is preferably set to the range of 0.3 to 2.0 mbar.

In this embodiment, the valve 32 is made of a thin film, and both ends of the valve are bonded to a top surface of the sealing sheet and the center portion of the valve is able to be lifted up by the increased gas pressure in the body 10.

Meanwhile, the valve 32 may be formed to have any structures and manners which are well known in the art, as well as the thin film, even if the valve is automatically opened under the allowable pressure or more. Therefore, the detailed description of the valve 32 will be omitted herein.

Preferably, the sealing sheet 30 further has on either surface thereof a filter 33 which is in close contact with the through-hole 31.

If the sealing sheet 30 has the filter 33, a liquid of the fermented food 100 contained in the body 10 is prevented from leaking outwardly from the container.

The filter 33 may be formed of a hydrophobic material.

If the filter 33 is made of the hydrophobic material, even though the filter comes into contact with the liquid of the fermented food 100, the filter does not absorb the liquid, and thus the function thereof is continuously sustained, thereby preventing the liquid from leaking outwardly from the container.

Preferably, the sealing sheet 30 is fused to the upper end of the body 10 by high-frequency fusion along an edge thereof.

If the edge of the sealing sheet 30 is fused to the upper end of the body 10 by the high-frequency fusion, the airtightness between the sealing sheet 30 and the body 10 is maintained.

The operation of the container A for keeping the fermented food according to the present invention to discharge the gas therefrom will be described in detail.

The sealing sheet 30 provided between the body 10 and the cover 20 is provided with the through-hole 31, and the gas generated from the fermented food 100 contained in the body 10 is discharged outwardly from the body 10 through the through-hole 31, as shown in FIG. 3.

The gas to be discharged from the through-hole 31 directly reaches the bottom surface of the cover 20, but the flow of the gas is interrupted by the bottom surface of the cover 20.

Meanwhile, since the cover 20 is provided with the gas flow channels 21 which extend from the center of the bottom surface of the cover 20 to the inner peripheral surface, the gas to be discharged from the through-hole 31 flows along the respective gas flow channels 21 from the center of the bottom surface of the cover 20 to the inner peripheral surface, as illustrated in FIG. 4.

The gas flowing toward the inner peripheral surface of the cover 20 is interrupted by inter interaction between the inner peripheral surface and the threads 23.

However, since the cover 20 is provided with the gas discharge channels 22 which extend from the upper end of the inner peripheral surface and transversely penetrate the threads 23, the gas flowing toward the inner peripheral surface is discharged outwardly along the gas discharge channels 22, as illustrated in FIG. 5.

Meanwhile, since the sealing sheet 30 is provided with the through-hole 31, the liquid of the fermented food 100 contained in the body 10 may be discharged outwardly through the through-hole 31, when impact is applied to the body 10.

According to the present invention, the sealing sheet 30 further has the filter 33 which is in close contact with the through-hole 31, on one inner surface of the body 10. The liquid of the fermented food is blocked by the filter 33, and thus does not pass through the through-hole 31, thereby interrupting the discharge of the liquid of the fermented food through the through-hole 31.

In addition, since the cover 20 is provided with the gas discharge channels 22 and the gas flow channels 21, the ambient air entering through the gas discharge channels 22 can flow into the body 10 through the gas flow channels 21.

According to the present invention, however, since the gas flow channels 21 are formed in the curved line and are arranged in the radial direction, the ambient air of the pressure lower than the gas cannot flow along the gas flow channels 21 due to the geometrical feature of the gas flow channels 21, thereby preventing the inflow of the ambient gas into the body 10 from the atmosphere.

The through-hole 31 has at the upper inlet the valve 32 which is automatically opened under the pressure higher than the allowable pressure. Even though the ambient air flows along the gas flow channels 21 in the state in which the valve 32 is closed, except for the discharge of the gas, the air is blocked by the valve 32, thereby stably preventing the inflow of the ambient air into the body 10.

With the above-described construction of the container A for keeping the fermented food according to the present invention, the sealing sheet 30 has the through-hole 31, and the cover 20 has the gas flow channels 21 and the gas discharge channels 22. After the gas generated in the fermenting process of the fermented food 100 flows to the cover 20 through the through-hole 31, the gas flows along the gas flow channels 21 and the gas discharge channels 22, and then is discharged outwardly from the body 10, thereby preventing the body 10 from being damaged due to the generation of the gas from the fermented food. In addition, the sealing sheet 30 further has the filter 33 which is in close contact with the through-hole 31. Since the filter 33 blocks the liquid of the fermented food 100 from leaking from the body 10 through the through-hole 31, it is possible to prevent the pollution caused by the leakage of the fermented food 100. Furthermore, the through-hole 31 is provided with the valve 32 which is automatically opened under the allowable pressure or more. The valve 32 allows the gas to discharge outwardly from the body 10 through the through-hole 31, and also blocks the inflow of the ambient air into the body 10 from the atmosphere, thereby preventing leaven from working in the fermented food 100 or the fermented food 100 from spoiling.

While the present invention has been described with reference to the particular illustrative embodiment, it is not to be restricted by the embodiments but only by the appended claims. It is to be appreciated that those skilled in the art can change or modify the embodiment without departing from the scope and spirit of the present invention.

DESCRIPTION OF THE REFERENCE NUMERALS IN THE DRAWINGS

10: body
11: neck
12: threads
20: cover
21: gas flow channels
22: gas discharge channels
23: threads
30: sealing sheet
31: through-hole
32: valve
33: filter
100: fermented food
A: container

What is claimed is:

1. A container for keeping fermented food, comprising:
a body configured to contain the fermented food therein;
a cover configured to close the body, said cover comprising;
  a plurality of gas flow channels which extend from a center of a bottom surface to an inner peripheral surface, and
  a plurality of gas discharge channels which extend from an upper end of the inner peripheral surface to a lower end;
a sealing sheet configured to maintain airtightness between the body and the cover said sealing sheet having a through-hole at a center thereof to allow an interior and an exterior of the body to communicate with each other;
a filter disposed on a bottom surface of the sealing sheet facing the interior of the body and covering a lower inlet of the through-hole; and
a single-layer valve having a periphery portion bonded directly to a top surface of the sealing sheet and a center portion surrounded by the periphery portion of the single-layer valve;
wherein the periphery portion of the single-layer valve is physically contacted by the cover on an upper side and simultaneously physically contacted by the sealing sheet on a lower side when the cover closes the body;
wherein the filter is made of hydrophobic material so that liquid is not able to pass through from the interior of the body to the through-hole while gas is able to pass through, and;
wherein the center portion of the valve covers an upper inlet of the through-hole, and is in contact with a perimeter of the upper inlet of the through-hole, and wherein the center portion of the valve is automatically lifted and opened when an allowable or greater pressure is generated by filtered gas in the through-hole.

2. The container for keeping the fermented food according to claim 1, wherein the gas flow channels are formed in a curved line, and are arranged in a radial direction.

3. The container for keeping the fermented food according to claim 1, wherein the gas discharge channels are formed to transversely penetrate threads which are formed on the inner peripheral surface.

4. The container for keeping the fermented food according to claim 1, wherein the allowable pressure is set to a range of 0.3 to 2.0 mbar.

5. The container for keeping the fermented food according to claim 1, wherein the through-hole is formed to have a diameter of 0.2 to 2.0 mm.

6. The container for keeping the fermented food according to claim 1, wherein the sealing sheet is fused to an upper end of the body along an edge thereof by high-frequency fusion.

* * * * *